United States Patent

Nagasubramanian

[11] Patent Number: 5,989,748
[45] Date of Patent: Nov. 23, 1999

[54] CYANOETHYLATED COMPOUNDS AS ADDITIVES IN LITHIUM/LITHIUM BATTERIES

[75] Inventor: Ganesan Nagasubramanian, Albuquerque, N. Mex.

[73] Assignee: The United States of America as represented by the United States Department of Energy, Washington, D.C.

[21] Appl. No.: 09/074,695

[22] Filed: May 8, 1998

[51] Int. Cl.[6] .................................................... H01M 4/58
[52] U.S. Cl. .................... 429/231.95; 429/248; 429/300; 429/303; 429/321; 429/322; 429/323; 429/324; 429/199
[58] Field of Search .................................. 429/300, 303, 429/321, 322, 323, 324, 199, 248, 218.1, 231.95

[56] References Cited

U.S. PATENT DOCUMENTS

| 3,247,414 | 4/1966 | Levetan | 313/108 |
| 4,668,595 | 5/1987 | Yoshino et al. | 429/194 |
| 5,631,100 | 5/1997 | Yoshino et al. | 429/217 |
| 5,783,331 | 7/1998 | Inoue et al. | 429/217 |

OTHER PUBLICATIONS

G. Nagasubramanian et al., "12–Crown–4–Ether–Assisted Enhancement of Ionic Conductivity and Interfacial Kinetics in Polyethylene Oxide Electrolytes," *J. Electrochemical Soc.*, vol. 137, No. 12, Dec. 1990, pp. 3830–3835.

*Primary Examiner*—Bruce F. Bell
*Attorney, Agent, or Firm*—Armand McMillan; James H. Chafin; William R. Moser

[57] ABSTRACT

The power loss of lithium/lithium ion battery cells is significantly reduced, especially at low temperatures, when about 1% by weight of an additive is incorporated in the electrolyte layer of the cells. The usable additives are organic solvent soluble cyanoethylated polysaccharides and poly(vinyl alcohol). The power loss decrease results primarily from the decrease in the charge transfer resistance at the interface between the electrolyte and the cathode.

8 Claims, 1 Drawing Sheet

Lithium Polymer Cell

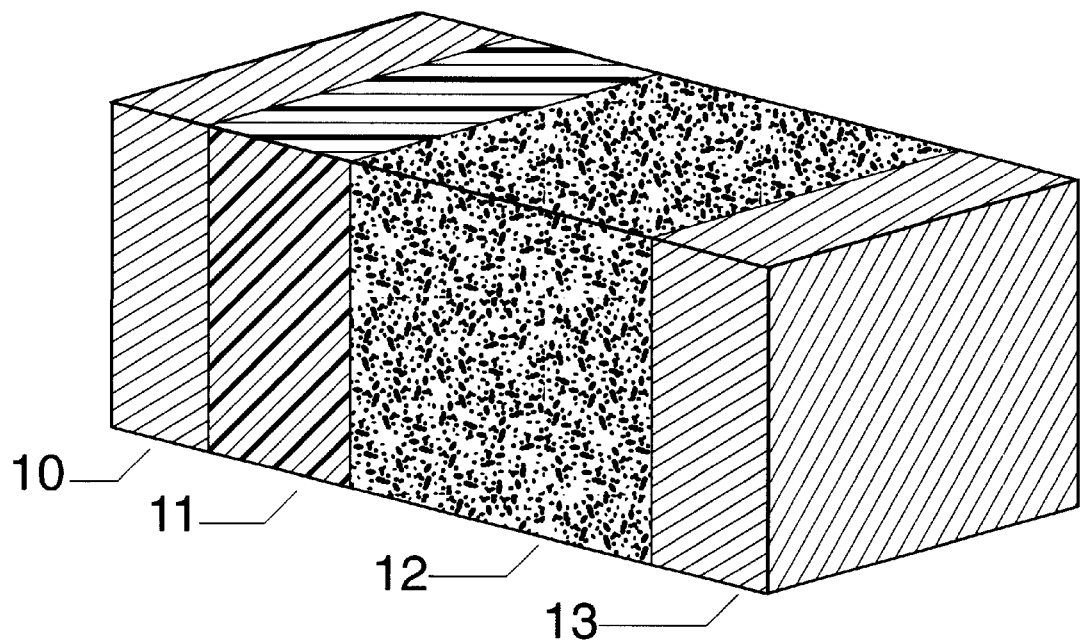
Lithium Polymer Cell

CYANOETHYLATED COMPOUNDS AS ADDITIVES IN LITHIUM/LITHIUM BATTERIES

The United States Government has rights in this invention pursuant to Contract No. DE-AC04-94AL85000 between the United States Department of Energy and Sandia Corporation.

BACKGROUND OF THE INVENTION

1. Field of the Invention

This invention relates to lithium/lithium ion batteries. It further relates to cyanoethylated additives that improve the performance of those batteries.

2. Description of the Prior Art

Essentially, all rechargeable batteries consist of several cells which in turn contain a cathode, an anode, and an ion carrying electrolyte. Usually, the electrolyte is a liquid and the anode and cathode are solids. In lithium polymer batteries (lithium batteries), the electrolyte is either a pure solid or a gel. The advantages of using a polymer solid or gel as electrolyte in batteries include (1) shape flexibility, (2) amenability to miniaturization, (3) extremely high surface to volume ratio, and so on.

Lithium battery technology is relatively new compared to that of conventional types such as the lead-acid battery and the nickel-cadmium battery. These conventional batteries contain aqueous electrolyte systems. Their practical energy density, measured in Wh/kg, is about 25 to 35 and about 35, respectively, which amounts to ⅛ and ⅐ of their theoretical density. In contrast, the lithium batteries have a practical energy density of about 120 Wh/kg, which amounts to ¼ of their theoretical density. They are more efficient than the liquid electrolyte types and they can be useful at higher temperatures, i.e., up to 100° C., as opposed to 50° or less for the other types.

Power and energy generation in lithium batteries involves the shuttling of lithium ions through the electrolyte in contrast to the two other types of batteries in which the electrolyte participates in the battery reactions. Further, the problems associated with electrolyte leakage is either minimized or eliminated in the lithium batteries. Yet, in spite of all their advantages, lithium batteries have not reached the commercial market due mainly to the very low room temperature ionic conductivity of the polymer electrolyte, the high interfacial transfer resistance, and the electrolyte/electrode interfacial resistance. Several approaches are being pursued to improve these properties. While these approaches attempt to increase the bulk ionic conductivity of the electrolyte, very little attention is being paid to concurrently decrease the interfacial charge transfer resistance ($R_{ct}$) and increase the interfacial stability. In a cell, both the electrolyte bulk ionic resistance and $R_{ct}$ are connected in series (in an equivalent circuit).

It is therefore an object of this invention to decrease the sum of the electrolyte bulk ionic resistance and the interfacial charge transfer resistance, as opposed to decreasing one and not the other.

Another object is to decrease the power losses in lithium batteries that is caused by the interfacial charge transfer resistance.

A further object is to make possible the design of lithium batteries that are lighter and more compact and yet can produce more power than the batteries of the art.

Additional objects, advantages, and novel features of the invention will become apparent to those skilled in the art upon examination of the following description or will be learned by practice of the invention.

BRIEF SUMMARY OF THE INVENTION

There is disclosed herein a lithium battery consisting of a plurality of cells connected in series, in which each cell consists of a lithium metal anode, an electrolyte which may be a polymeric substance or a liquid mixture containing a small quantity of additive, a lithium cobalt oxide cathode, and a current collector. The additives that are used to accomplish the objects of the invention are cyanoethylated hydroxyl-containing compounds such as polysaccharides and polyvinyl alcohol.

BRIEF DESCRIPTION OF THE DRAWING

The accompanying drawing, which is incorporated in and forms part of the specification, further illustrates the invention and, together with the textual description, serves to explain the principles of the invention.

Shown in the drawing is a simplified sectional prospective sketch of a lithium battery cell.

DETAILED DESCRIPTION OF THE INVENTION

As illustrated in the drawing, a lithium battery cell contains a lithium metal anode 10, an electrolyte 11, a cathode 12, and a current collector 13. Typical thicknesses of such cells are 10–50 μm for the anode, 5–50 μm for a gel electrolyte, 50–100 μm for the cathode, and 5–10 μm for the current collector. This adds up to a total cell thickness of 70–210 μm. In rechargeable batteries, the electroactive species, $Li^+$ ions, moves from the anode to the cathode during discharge and from the cathode to the anode during charge. During their motion, the lithium ions face several resistance/impedances, including the bulk electrolyte resistance and the interfacial charge transfer resistance ($R_{ct}$). Primarily, those two resistances control the quantity of power that the battery can deliver. Over the years, many different approaches have been made to lower the bulk ionic conductivity of the electrolyte to >$10^{-3}$ S/cm at room temperature. For example, one of the approaches has involved immobilizing organic liquid electrolytes in electrochemically inactive host polymers such as poly (acrylonitrile) (PAN) and poly(vinylidene difluoride) (PVDF). These are gelled electrolytes. Yet, in such embodiments, the $R_{ct}$, which acts in series with the bulk electrolyte resistance, is not optimized and still severely impedes the realizable power.

The effect of the $R_{ct}$ on the power output of a cell is illustrated in the following table which shows the relative power losses for two interfacial resistances for the same conductivity compared to $R_{ct}=0$.

TABLE 1

Comparison of power losses for two different $R_{ct}$'s compared to $R_{ct}$ = 0

| (S/cm) | $R_{ct}$ ($\Omega \cdot cm^2$) | % of power loss compared to $R_{ct}$ = 0 |
|---|---|---|
| $10^{-3}$ | 100 | −50 |
| $10^{-3}$ | 500 | −83 |

As indicated in the above table, the relative power loss can be as high as 83% for $R_{ct}$=500 compared to $R_{ct}$=0. This underscores the importance of low interfacial resistances, especially for high power applications. Also, the effect of $R_{ct}$ is much more pronounced at subambient temperatures, e.g., at −20° C., than at elevated temperatures. Even the state-of-the-art non-aqueous electrolytes such as propylene carbonate/diethyl carbonate mixture or ethylene carbonate/dimethyl carbonate mixture currently used in lithium ion batteries have unacceptable $R_{ct}$ values, especially at subambient temperatures. In some cases, $R_{ct}$ values as high as 500 $\Omega.cm^2$ have been reported.

Significant reduction of the $R_{ct}$ of lithium battery electrolytes has now been achieved by adding small quantities, about 1 w %, of saturated hydroxyl-containing compounds that possess lithium-resistant functional groups and are soluble in organic solvent such as methyl ethyl ketone, methyl formate, ethyl formate, methyl acetate, 2-methyltetrahydrofuran, tetrahydrofuran, 4-methyl dioxolane, 1,3-dioxolane, and the like. Usable additives of that type include cyanoethylated polysaccharides and cyanoethylated poly(vinyl alcohol) in which the number of [—CH$_2$—CH(OR)—] units is not greater than about 10. In these additives, the hydrogen atoms of the hydroxyl groups have been replaced by cyanoethyl groups (—CH$_2$—CH$_2$CN). Preferred compounds are cyanoethylated sucrose, cyanoethylated cellulose, and cyanoethylated poly(vinyl alcohol).

The invention will now be illustrated with a few examples which describe its preferred embodiments. It must be kept in mind that these examples are not intended to nor do they limit the invention beyond the scope of the appended claims.

ELECTROLYTE AND FILM PREPARATION

Preparation of Liquid Electrolyte Stock Solution [EC/PC/LiPF$_6$]

A solvent is prepared with ethylene carbonate (EC) and propylene carbonate (PC) in a 1:1 proportion by volume. LiPF$_6$, about 7.6 g, is added to 50 ml of the solvent and the mixture is stirred at room temperature until all the solids are dissolved. Other carbonates, including dimethyl carbonate (DMC) and diethyl carbonate (DEC) can also be used as solvent.

Preparation of Poly(vinylidene difluoride) Gelled Film [EC/PC/LiPF$_6$/PVDF]

Poly(vinylidene difluoride) (PVDF), 1 g, is dissolved in 15 ml of methyl ethyl ketone by stirring at about 35° C. To this is added 2.002 g of the electrolyte stock solution. The mixture is stirred thoroughly. Films of different thickness are then made by the doctor-blade technique and the ketone solvent is allowed to evaporate.

Preparation of PVDF Film with Additive [EC/PC/LiPF$_6$/PVDF/YCN]

A cyanoethylated additive, 0.1 g YCN, wherein Y=SU (sucrose), CE (cellulose), or PV poly(vinyl alcohol), is dissolved in 10 ml of the stock solution. Also, 1.00 g PVDF is dissolved in about 15 ml of methyl ethyl ketone, and 2.002 g of the additive-containing electrolyte solution is mixed in. A thin film is then made as described above. Note: PVCN and CECN can be used as received from commercial sources, but SUCN is pumped for about 4 hours at about 60° C. to desorb any moisture it may contain.

Preparation of Stock Solution Containing Additives [EC/PC/LiPF$_6$/YCN+XCN]

YCN, e.g., cyanoethylated sucrose (SUCN), 1.08 g, is dissolved in 20 ml of 1:1 V % EC/PC carbonate mixture.

XCN, e.g., cyanoethylated cellulose (CECN), 0.26 g, is dissolved in 50 ml of the same carbonate mixture.

The two solutions are then combined and rinsed with 20 ml of the carbonate mixture. The resulting solution is then diluted with 35 ml of the carbonate mixture to yield 125 ml of the additives-containing stock solution. To 10 ml of this solution is added 1.52 g LiPF$_6$ salt.

Preparation of PVDF Film with two Additives [EC/PC/LiPF$_6$/PVDF/YCN+XCN]

Thin films are prepared from the salt-containing two additive solution by the same procedure used above for one-additive films.

EXAMPLES 1 TO 4

Four different PVDF films were prepared by the procedures described above. The proportions and components used were the same for all films, except for the additives, namely 1:1 EC/PC+1 M LiPF$_6$ per liter of EC/PC. One film did not contain any additive (Example 1). The additives used in the carbonate solution in the other films were as follows:

Example 2: 0.1 g cyanoethylated sucrose (SUCN)

Example 3: 0.1 g cyanoethylated cellulose (CECN)

Example 4: 0.1 g of 4:1 cyanoethylated sucrose and cellulose (SUCN+CECN, 4:1)

The conductivity (S/cm) and the charge transfer resistance, $R_{ct}$ ($\Omega.cm^2$), were measured at three different temperatures. The results are reported in Table 2.

TABLE 2

Conductivity and Charge Transfer Resistance of PVDF Films

| PVDF-Based Film | Conductivity (S/cm) | | | $R_{ct}$ ($\Omega \cdot cm^2$) | | |
|---|---|---|---|---|---|---|
| | Room T | 40° C. | 50° C. | Room T | 40° C. | 50° C. |
| Ex. 1 no additive pumped | 0.00166 | 0.00162 | 0.00138 | 404 | 302 | 63 |
| Ex. 2, SUCN as prepared | 0.0021 | 0.00176 | 0.00151 | 376 | 80 | 55 |
| Ex. 3, CECN as prepared | 0.00121 | 0.00188 | 0.00148 0.00102* | 377 | 60 | 35 75* |
| pumped | 0.00103 | 0.00108 | 0.00098 0.00090* | 383 | 67 | 32 93* |
| pumped area 36 cm$^2$ | 0.00019 | 0.00041 | 0.00084 | 358 | 50 | 8 |

TABLE 2-continued

Conductivity and Charge Transfer Resistance of PVDF Films

| PVDF-Based Film | Conductivity (S/cm) | | | $R_{ct}$ ($\Omega \cdot cm^2$) | | |
|---|---|---|---|---|---|---|
| | Room T | 40° C. | 50° C. | Room T | 40° C. | 50° C. |
| Ex. 4, SUCN + CECN as prepared | 0.00117 | 0.00149 | 0.00124 0.00099* | 259 | 56 | 23 59* |
| pumped | 0.00123 | 0.00125 | 0.00128 0.00068* | 351 | 71 | 35 69* |
| pumped area 36 cm² | 0.00021 | 0.00039 | 0.00057 0.00059* | 301 | 45 | 16 16* |

*Value after 5 days

As the results in the above table show, the addition of small quantities of cyanoethylated compounds to lithium battery electrolytes does not affect their bulk conductivity significantly, all values remaining in the $10^{-3}$ range. On the other hand, a large drop in charge transfer resistance ($R_{ct}$) is caused by the additives, especially at the higher temperatures and also for films with a large area.

EXAMPLES 5 AND 6

Two more 36 cm² poly(vinylidene difluoride) films were prepared as described earlier. One film contained cyanoethylated sucrose and cyanoethylated cellulose (Example 6) and the other did not contain any additive (Example 5). The bulk conductivity and the charge transfer resistance of both films were measured at low temperatures. The results obtained are shown in Table 3.

TABLE 3

Effect of Additive on Conductivity and Charge Transfer Resistance at Low Temperatures

| PVDFD-Based Film | | No additive, pumped Area: 36 cm² Thickness: 4 mils | SUCN + CECN (3.7:1) Area: 36 cm² Thickness: 3 mils |
|---|---|---|---|
| Conductivity (S/cm) | 10° C. | 0.00058 | 10° C. 0.00029 |
| | 0° C. | 0.00048 | 0° C. 0.0002 |
| | -10° C. | 0.00026 | -10° C. 0.00011 |
| | -20° C. | 0.00017 | -20° C. 0.00006 |
| $R_{ct}$ ($\Omega \cdot cm^2$) | 10° C. | 637 | 10° C. 315 |
| | 0° C. | 1784 | 0° C. 715 |
| | -10° C. | 6138 | -10° C. 2286 |
| | -20° C. | 20340 | -20° C. 7092 |

As can be seen in the above table, the conductivity of the film without additives is marginally higher. However, the charge transfer resistance, which controls the overall cell impedance, is substantially lower for the film with additives. For instance, at -20° C., the additives lower the $R_{ct}$ from 20340 to 7092 $\Omega \cdot cm^2$, an improvement of about 200%.

EXAMPLES 6 TO 11

Lithium salts of cyanoethylated sucrose ($Li_xSUCN$, where x is has a value of 2 to 7) were added to liquid electrolytes made of ethyl carbonate/dimethyl carbonate, 1:1 by volume, and 1 mole of $LiPF_6$ salt ($EC/DMC-LiPF_6$). For comparison purposes, one of the electrolytes did not contain any additive. The resistance of these preparations was measured and is reported in Table 4.

TABLE 4

Lithiuin salts of Cyanoethylated Sucrose in Liquid Electrolyte

| Liquid Electrolte Composition [EC/DMC—LiPF₆(1M)] [+Li$_x$SUCN] | Resistance (ohms) | | % Variation | |
|---|---|---|---|---|
| | Bulk | Interfacial | Bulk | Interfacial |
| No additive | 17.1 | 19.0 | 0 | 0 |
| Li₂SUCN* | 16.2 | 24.0 | -6 | 25 |
| Li₃SUCN* | 13.9 | 17.1 | -19 | -10 |
| Li₄SUCN* | 17.0 | 14.4 | <-1 | -24 |
| Li₅SUCN* | 15.6 | 15.9 | -9 | -15 |
| Li₆SUCN* | 12.5 | 14.8 | -27 | -22 |
| Li₆SUCN* | 17.6 | 10.2 | 3 | -46 |

*= 0.1 g salt per 10 ml electrolyte solution
**= 0.2 g salt per 10 ml electrolyte solution As the results show, both the bulk resistance and the interfacial resistance are significantly decreased by the addition of the lithium salts of cyanoethylated sucrose which contain 3 to 7 lithium atoms per molecule. While no preparations were tested that contained the sucrose lithium salt only, it appears possible that the other salt, $LiPF_6$, could be eliminated from compositions containing an appropriate quantity of a lithium salt of a cyanoethylated compound.

It will be evident to those skilled in the art that the improved lithium batteries described herein have great commercial potential as miniaturized power sources for lap-top computers, telephones, and various other electronic equipment. Also, electrochemical and thermodynamic data now indicate that lithium/lithium ion batteries may well be used as power sources in electric vehicles.

What I claim is:

1. A lithium/lithium ion battery consisting of a plurality of cells connected in series, in which each cell consists of a lithium anode, an electrolyte, a lithium cobalt oxide cathode, and a metallic current collector, wherein said electrolyte contains about 1% by weight of an additive selected from the group consisting of cyanoethylated polysaccharides, cyanoethylated poly(vinyl alcohol), and mixtures thereof, said additives being soluble in organic solvents.

2. The battery of claim 1, wherein the electrolyte is a liquid mixture of organic carbonates and $LiPF_6$.

3. The battery of claim 2, wherein the organic carbonates are selected from the group consisting of ethylene carbonate, propylene carbonate, dimethyl carbonate, diethyl carbonate, and ethylmethyl carbonate.

4. The battery of claim 2, wherein the electrolyte is a gel consisting of the liquid mixture and poly(vinylidene difluoride).

5. The battery of claim 2, wherein the liquid carbonate mixture consists of ethylene carbonate and propylene carbonate and the additive is selected from the group consisting of cyanoethylated sucrose, cyanoethylated cellulose, cyanoethylated poly(vinyl alcohol), and mixtures thereof.

6. The battery of claim 5, wherein the liquid carbonate mixture consists of ethylene carbonate and dimethyl carbonate.

7. The battery of claim 1, wherein the cyanoethylated compound is added in the form of its lithium salt.

8. The battery of claim 7, wherein the electrolyte consists of a mixture of organic carbonates, the lithium salt of the cyanoethylated compound, and poly(vinylidene difluoride).

* * * * *